Dec. 11, 1956 B. KLEINERMAN 2,773,416

UNIVERSAL MAGNETIC SOUND ADAPTER FOR MOTION PICTURE PROJECTORS

Filed April 23, 1953 2 Sheets-Sheet 1

INVENTOR.
BEN KLEINERMAN
BY Morton Amster
ATTORNEY

UNIVERSAL MAGNETIC SOUND ADAPTER FOR MOTION PICTURE PROJECTORS

Filed April 23, 1953 2 Sheets-Sheet 2

INVENTOR.
BEN KLEINERMAN
BY Morton Amster
ATTORNEY 2,773,416

UNIVERSAL MAGNETIC SOUND ADAPTER FOR MOTION PICTURE PROJECTORS

Ben Kleinerman, Flushing, N. Y., assignor, by mesne assignments, to Coastal Commercial Corporation, New York, N. Y., a corporation of New York Application April 23, 1953, Serial No. 350,667

17 Claims. (Cl. 88—16.2)

The present invention relates to sound apparatus for motion picture equipment, in particular to a universal magnetic sound adapter for interchangeable assembly with existing silent and optical-sound film projectors.

A simplified technique for recording sound on optical-sound and silent films involves the application of a continuous magnetizable ferrous or ferric-oxide edge coating, and the subsequent recording of voice, music or composite arrangements on the magnetically sensitized film by the use of a standard magnetic recording and playback head. The facility of this approach may be appreciated, particularly by home-movie enthusiasts, when it is considered that synchronized recordings can be made while projecting the magnetically sensitized film; immediate playback merely requires rewinding and rethreading of the film; and the recordings may be permanent, or periodically erased and new recordings substituted without destroying the usefulness of the film.

Known equipment for converting silent film to magnetic sound employs a magnetic recording and playback head with provision for erasing in advance of recording. The standard head is arranged in advance of the picture-projecting system, and appropriate external sound amplifiers having microphonic and phonographic inputs and a loudspeaker output are provided for selectively recording, playing-back, and re-recording on the magnetically-sensitized film. Installation of the head has been heretofore limited to certain types of standard projectors due to mechanical considerations which often require material modification of the projectors, as and for example, by the removal and/or addition of parts. The problem becomes still more troublesome when it becomes necessary to frequently reconvert the projector to its normal mode of operation without magnetic sound.

Accordingly, it is an object of the present invention to provide a novel sound adapter for existing optical-sound and silent projectors obviating one or more of the aforesaid difficulties. Specifically, it is within the contemplation of the present invention to provide an attachment for installing magnetic sound which is universal with respect to all types of motion-picture projectors, requires no modification of the projector in providing the changeover to magnetic sound, and involves a minimum of complexity.

Certain objects and features of the invention have been attained by advantageously employing a standard which is common to the several types of projectors, namely the feed spindles which receive reels carrying the optical-sound or silent film. Since film feed reels for the wide variety of projectors encountered are to be interchanged and are universal, the magnetic sound adapter is attached at the feed spindles which can be relied upon as a common standard. In accordance with a preferred feature of the invention, the magnetic sound adapter precedes the picture projection system (considered from the viewpoint of the film passing through the projector) and requires no modification, addition to, or removal of components from the projector.

In accordance with a further feature of the invention, the feed spindle, normally relied upon to mount the reel of film and establish a predetermined feed path with respect to the projector, serves as a reference in mounting the magnetic sound adapter to reestablish the predetermined film feed path and to minimize the risk of improper delivery of film to the projector.

As a further feature, the universal sound adapter is arranged to accommodate film reels of varying sizes without interference with the prescribed operation of the projector.

As a still further feature, the adapter is constructed and arranged to assure delivery of the film to the projector at angles within the range normally encountered when the film is directly supported on the main spindle.

Many other objects, advantages and features of the invention will occur to those skilled in the art as the description proceeds. In order to render understanding of the invention more complete and lucid, and further to comply with the statutes relating to the same, and to point out precisely where I have made a patentable advance in the arts and sciences, the invention has been shown in detail in conjunction with the accompanying specification and drawings. In the drawings Fig. 1 is an assembly view, diagrammatically showing a magnetic-sound adapter embodying features of the invention, applied to a silent-film projector and associated with an external amplifier and allied equipment;

Figures 1, 2, 3:
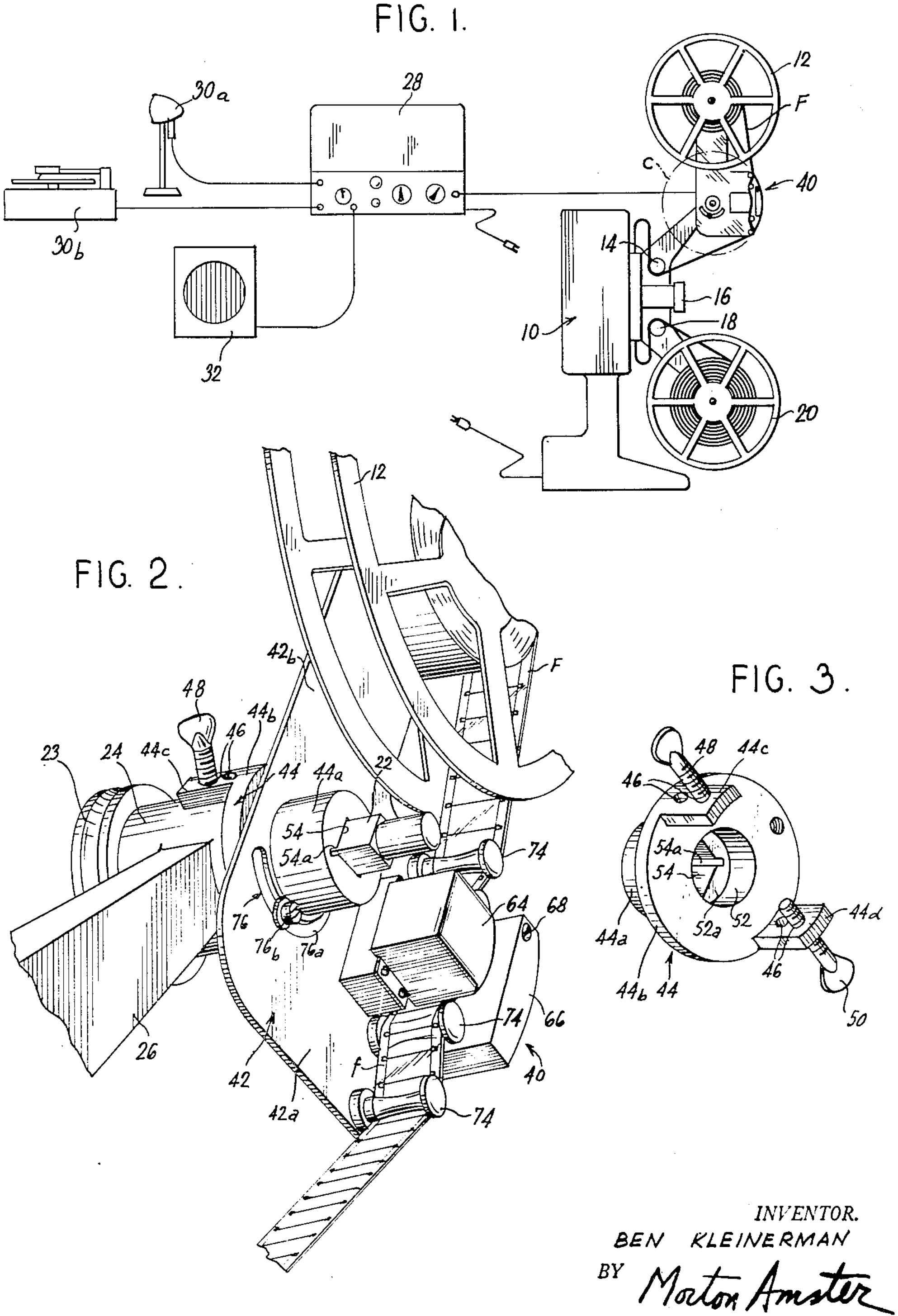
Fig. 2 is a fragmentary perspective on an enlarged scale with parts broken away, showing the details of the magnetic-sound adapter supporting a reel of film threaded along a predetermined feed path, and in operative relation to a magnetic recording and reproducing head.
Fig. 3 is an enlarged perspective view of an attachment collar or head for supporting the magnetic-sound adapter on the feed arm of a typical silent projector.
Figure 5:
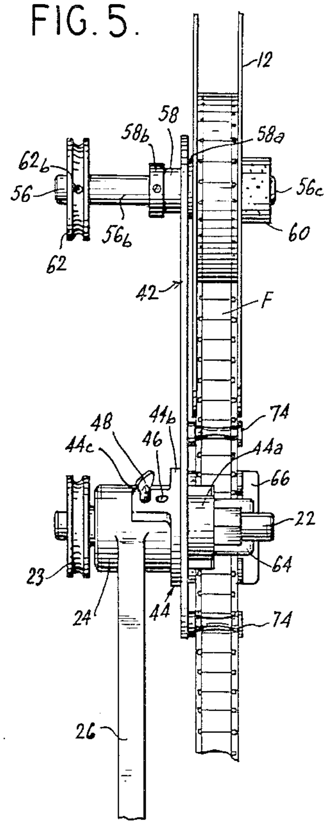
Fig. 5 is an elevational view taken from the left of Fig. 4.

Referring now specifically to Fig. 1, there is shown a typical home-movie unit including a silent projector 10 of the type having a feed reel 12 which delivers film F over a constant-speed feed sprocket 14 through a picture projection system 16 and over a further sprocket 18 to a take-up reel 20. Normally the film-feed reel 12 of the projector is supported on a feed spindle 22 (see Fig. 2 journaled within a transverse bearing 24 on a feed arm 26 of the projector. As seen best in Fig. 6, the feed spindle 22, journaled in the bearing 24, includes a substantially square reel-supporting section **22*a*, terminating in a lateral reference shoulder or abutment 22*b* against which the film reel 12 is normally brought to bear to establish a predetermined feed path or plane with respect to the feed sprocket 14 of the projector 10. Associated with the motion-picture projector 10 is a suitable amplifier 28 having input connections to appropriate sources of voice or music, such as the microphone 30*a* and the record player 30*b*, and further output connection to a speaker 32**.

In accordance with the present invention, the projector 10, which may be of the silent or optical-sound type is adapted for magnetic sound by an attachment, generally designated by the reference numeral 40, mountable at the feed spindle 22. Specific reference will now be made to Figs. 2 to 6 inclusive, wherein the adapter 40 is seen to include a support or base plate 42 having a mounting section 42*a* and a projecting arm or extension 42*b*.

Supported on the mounting section 42*a* of the support 42 is a clamping attachment or collar 44, the details of which are seen best in Fig. 3. The collar 44 includes a cylindrical bearing section 44*a* projectable through a complementary opening within the support 42 and extending outwardly from one side of a base flange 44*b* which is adapted to underlie and bear against the support 42. Projecting outwardly from the opposite side of the flange 44*b* are opposed legs or fingers 44*c*, 44*d* of a length and separation selected to permit accommodation of fixed projector parts of various size, such as the journal or bearing 24.

The opposed fingers or legs 44*c*, 44*d* are provided with several sets of aligned tapped holes 46 which receive complementary threaded clamp bolts 48, 50. As is apparent, the clamp bolts 48, 50 may be accommodated in any one of the aligned sets of tapped holes and are radially adjustable toward and away from each other for clamping a member interposed therebetween. If, for example, the fixed projector part terminates exceptionally close to the support 42, the clamping bolts 48, 50 are appropriately supported in the nearest set of tapped holes, to facilitate easy mounting of the support 42 on the projector.

Figure 6:
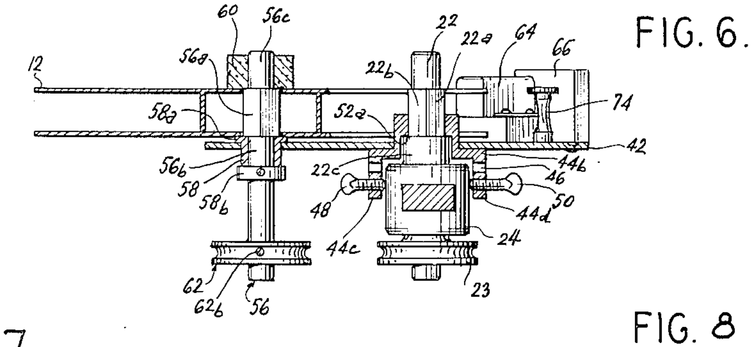
Fig. 6 is a sectional view taken substantially along the line 6—6 of Fig. 4 and looking in the direction of the arrows.

The attachment collar 44 is further provided with a generally cylindrical bore or countersink 52 terminating in an abutment ledge or bottom wall 52*a* which is adapted to bear against the reference shoulder 22*b* of the feed spindle 22. As seen in Fig. 6, the cross-section of the bore or countersink 52 is sufficient to accommodate the adjacent shaft section 22*c* and provides an annular clearance space to allow the abutment 52*a* to be brought into bearing contact with the reference shoulder 22*b* for a purpose to be subsequently described. Coaxial with and opening into the bore 52 is a square passage 54 accommodating the complementary shaft section 22*a*. The passage 54 is provided with a keyway 54*a* which permits mounting of the adapter on a round feed spindle having a radial guide key. Of course, the cross-section of the passage 54 is selected to accommodate the largest shafts, usually 5/16″ square or round. The depth of the bore 52, that is, the distance from the innermost face of the flange 44*b* to the annular shoulder 52*a*, is selected to reestablish the prescribed feed path or plane for the feed reel 12 when mounted on the adapter. The exact dimensioning of the bore or countersink 52 will subsequently become apparent.

Supported on the extension 42*b* of the support 42 is an auxiliary spindle 56 including an intermediate reel-supporting section 56*a* and a rearwardly-extending mounting section 56*b*. The auxiliary spindle is journaled within an appropriate sleeve bearing 58 having a flanged end 58*a* which is interposed between the support 42 and the reel-supporting section 56*a*. The shaft 56 has an integral or separate stop 58*b* engaging against the sleeve bearing to preclude inadvertent removal of the shaft. As seen best in Fig. 6, the film feed reel 12 is supported on the section 56*a* of the auxiliary feed spindle 56 and maintained thereon by any appropriate means, such as the elastomer stop member 60 received on the round spindle section 56*c* and bearing against the feed reel.

The reel-supporting section 56*a* may be round in section with a keyway, as illustrated, to accommodate either 8 mm. or 16 mm. reels, or may be square in section as is the main spindle 22.

The dimensioning of the countersink 52 will now become apparent, when considering that the reference shoulder 22*b* initially established the required position of the feed reel 12, relative to the projector. Accordingly to reestablish this position, the depth of the countersink or bore 52 must be such as to compensate for the lateral offset imparted to the reel 12 by the thickness of the support 42 and the thickness of the flanged end 58*a* of the sleeve bearing 58.

Disposed on the auxiliary spindle 56 is a rewind pulley 62 which is slidable to predetermined longitudinally spaced locations along the shaft section 56*b* and securable in an adjusted position by an appropriate stop screw 62*b* or the like. The rewind pulley 62 is adjusted into substantial coplanar relation with respect to the rewind drive, not shown, normally corresponding to the position of the rewind pulley 23 of the feed spindle 22. It is to be noted that the pulley 23 is not employed when the adapter is connected to the projector 10, rewind being effected by the pulley 62 and an appropriate connection to the rewind drive.

Fixed to the mounting section 42*a* of the support 42 is a standard magnetic recording and playback head 64 of the type having provision for erasing of previous recordings prior to recording. Since the details of the standard head 64 form no part of the present invention, it will suffice to point out that the head is capable of recording on magnetic tape of the type having an iron oxide coated edge when energized from an appropriate input, such as illustrated in Fig. 1. The magnetic head 64 has a film contact face 64*a* formed with a slight curvature, a pressure-applying member 66 being arranged in operative relation to the contact face 64*a* to urge the film F into the uniform engagement with the head 64. The pressure-applying member 66 may take any suitable form, and for illustrative purposes has been shown pivoted on a pin 68 and provided with relatively soft pressure pads 70, supported on a resilient platform 72. Appropriate cooperating catch means may be provided on the pressure-applying member 66 and on the underlying support 42 (i. e. a spring biased ball receivable within a complementary depression) to detachably lock the pressure-applying member in the operative position of Fig. 4. The provision of the cooperating catch, not shown, and the pivot 68, permit this pressure-applying member to be moved to a clearance position (illustrated by the broken lines of Fig. 4) to facilitate threading of the film F over the head 64.

Leading and trailing the assembly of the magnetic head 64 and the pressure-applying member 66 are plural guide pins or members 74 which define sinuous runs *f* for the film. The guide pins 74 cooperate with the pressure-applying member 66 and assure that the film will pass over the magnetic head 64 in uniform contact with the recording and reproducing means thereon.

Figure 7:
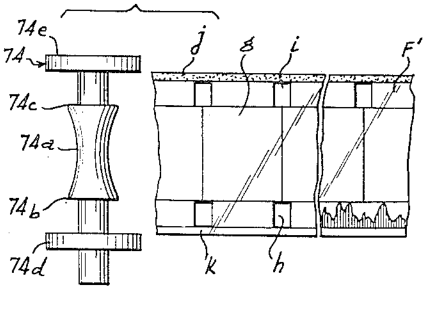
Fig. 7 is a plan view, on an enlarged scale showing the details of the guide members for directing 16 mm. film past the magnetic recording and reproducing head; and, Fig. 8 is a plan view, on an enlarged scale, of modified guide members for directing 8 mm. film past the magnetic recording and reproducing head.
Figure 8:
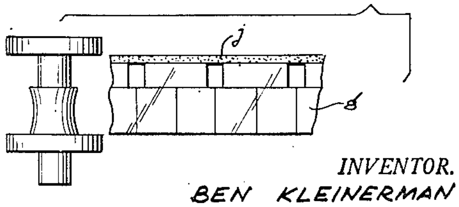

The details of the respective guide members 74, specifically their construction with relation to the film F, will be best appreciated by reference to Figs. 7 and 8 wherein there is disclosed preferred embodiments of the guide members for 16 mm. film (Fig. 7) and for 8 mm. film (Fig. 8). Specifically, film such as the 16 mm. strip F′ of Fig. 7 includes an intermediate frame section *g*, marginal sprocket hole sets *h*, *i*, a magnetically sensitized edge *j* outwardly of one set of sprocket holes, and a balancing edge *k* outwardly of the other set of sprocket holes. Although the film strip F′ has been illustrated as the type conventionally used with silent projectors, it should be noted that in lieu of the sprocket hole set *h*, optical sound modulations might be provided in the area formerly occupied by the sprockets *h* as indicated by the dot-dash lines. To accommodate either the 16 mm. silent film F′ or the similar optical sound film, the guide member 74 includes a median relieved section 74*a*, substantially coextensive with the frame section *g* and terminating in spaced apart line-contact supports 74*b*, 74*c*. It is to be observed that the line-contact supports 74*b*, 74c are slightly offset inwardly with respect to the side edges of the frame section g to avoid having the supports 74b, 74c enter or rip the respective sets of sprocket holes h, i. The guide member 74 further includes stop flanges 74d, 74e spaced apart sufficiently to provide adequate clearance for the entire width of the film and an integral head or rivet 74f for mounting on the support 42. The guide member is cut away intermediate the inner faces of the stop flanges 74d, 74e and the adjacent line contacts 74b, 74c to provide clearance for the respective sets of sprocket holes and the recording edge. It is to be expressly noted that this type of construction is equally adapted for optical sound films where the modulations occupy the area on one side of the frame section g (corresponding to the location of the sprocket hole set h) since the clearance space provided between the stop flange and the adjacent line contact 74b avoids scratching or marring of the optical sound track.

The details of the alternative type of guide member 74′, illustrated in Fig. 8, for use with 8 mm. film will readily be appreciated when it is noted that the 8 mm. film corresponds to a longitudinal half of the 16 mm. film, that is the strip between the oxide coated edge j and the longitudinal center line of the frame section g. Accordingly, the details of the alternative guide members 74′, to be used when adapting for sound reproduction on 8 mm. film, will be omitted. It is to be further noted that guide members for 35 mm. film would be substantially the same as those for 16 mm. film.

The proportioning and critical location of the support 42 with respect to its environment will now be appreciated. Specifically, the mount section 42a of the support 42 is dimensioned to lie within the outline of the smallest reel normally suportable on the main spindle 22. Conventionally, the smallest reels employed are for 8 mm. film, a typical reel size in relation to the surroundings being illustrated by the circular dot-dash line of Fig. 1 designated by the reference letter C. Since all types of projectors can accommodate at least the small 8 mm. reel, it is possible to associate the adapter of the present invention to any of these existing projectors.

Figure 4:
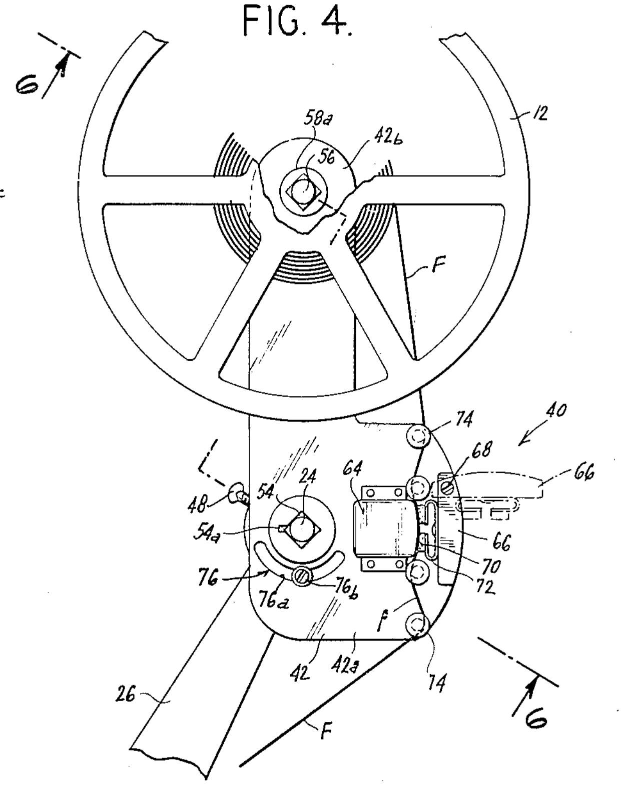
Fig. 4 is an elevational view, with parts broken away, of the magnetic-sound adapter.

Additionally, it is to be observed that the projecting extension 42b extends toward a clearance position with respect to the projector and is of a length selected, with respect to the largest reel sizes normally encountered (i. e. 400 foot reels having 15″ diameters) to support such reels without interference with other components of the adapter and projector operation. As seen in Fig. 4, the mount section 42a carries the components of the adapter except for the auxiliary spindle, and accordingly the length of the extension 42b is substantially equal to the radius of the largest reel.

Operatively interconnected between the support 42 and the attachment or clamp collar 44, is a pin and slot means 76, permitting independent rockable adjustment of the support 42 in its normal plane and about the axis of the bearing section 44a. Specifically, the mounting section 42a is provided with an arcuate segmental slot 76a traversing an arc of approximately 90°, a clamp screw 76b extending through the arcuate slot 76a and being tapped into the underlying flange 44b of the collar 44. The purpose of this arcuate adjustment, permitting swinging movement of the support 42 through an angle of approximately 90° with respect to the supporting collar 44, will become apparent when it is considered that projector arms, such as 26, may extend in many directions from the projector. This often facilitates support of the adapter 40 in only one relative position with respect to the arm by means of the universal attachment collar 44. Since it is desirable that the film being delivered to the projector from the adapter 40 at take-off angles within the range prescribed when the reel 12 is supported directly on the main spindle 22, the independent rocking adjustment permits the desired relative feed with respect to the projector 10.

A typical manner of applying the attachment of the present invention will now be set forth. In lieu of mounting the film feed reel 12 directly on the spindle 22 of the projector 10, the clamping head 44 is brought into the position of Fig. 2 whereupon the screws or clamp bolts 48, 50 are tightened down to mount the adapter 40 on the projector 10. As pointed out, the exact position of the adapter cannot be readily predicted since the initial rotational position of the clamp 44 with respect to the projector may vary when employing different types of projectors. Thereupon, if necessary, the adapter is rocked into a prescribed rotational position with respect to the projector by loosening the screw 76b, making the adjustment, and retightening the screw. The feed reel 12 is mounted on the auxiliary spindle 56, the mode of application being the same as in conjunction with the application of the feed reel to the spindle 22. It is to be again observed that the feed reel 12 lies in the same general plane or position relative to the projector as if directly mounted on the spindle 22, and accordingly the prescribed feed or delivery path to the projector is in no way disturbed. Thereupon, with the reel 12 properly supported, the film F is delivered over the magnetic record and reproducing head 64 by feeding along the leading and trailing sinuous runs f, and by bringing the pressure-applying member 66 into the operative position, illustrated by the full lines of Fig. 4. The film is then fed through the projector in the conventional manner, depending upon the type of projector being employed. Thereafter, concurrent with projection, it will be possible to record on the magnetically sensitized edge of the film F, for example, with equipment such as shown in Fig. 1.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

What I claim is:

1. The combination with a motion picture projector including a spindle normally adapted to support a film reel, of an adapter including a support, attachment means on said support for operative connection to said projector at said spindle, an auxiliary spindle on said support spaced from said attachment means for mounting said film reel, and transducing means on said support which the film traverses during operation of said projector.

2. The combination with a motion picture projector including a spindle normally adapted to support a film reel, of an adapter including a support, attachment means on said support for operative connection to said projector at said spindle, an auxiliary spindle on said support spaced from said attachment means for mounting said film reel, transducing means on said support which the film from said film reel traverses during operation of said projector, and guide means for directing said film along a predetermined path with respect to said transducing means.

3. A sound attachment for a motion picture projector of the type having a spindle normally mounting a reel of film and establishing a predetermined film feed path with respect to said projector comprising a support including an auxiliary spindle for mounting said reel of film, means on said support and operatively connectable at the projector spindle for mounting said support and reestablishing said predetermined film feed path, and a magnetic recording and playback head on said support and arranged along said predetermined film feed path.

4. A sound attachment according to claim 3 wherein the means connectable at said means spindle includes a mounting head provided with a countersink having an abutment engageable with said main spindle.

5. A sound attachment according to claim 3 including means in operative relation to said recording and playback head for uniformly contacting the film of said reel against said head.

6. The combination with a motion picture projector including a feed spindle having a reference shoulder normally supporting a film reel in a laterally adjusted position for proper film feed to said projector, of a sound adapter including a support having an auxiliary spindle for mounting said film reel, means on said support operatively arranged with respect to said reference shoulder for connecting said support to said projector with said film reel in said laterally adjusted position, and a recording and playback head on said support over which the film passes during feed to said projector.

7. The combination with a motion picture projector including a main spindle normally adapted to support a reel which delivers film to said projector at take-off angles variable over a limited range, of an adapter including a support, clamping means on said support for operative connection to said projector at said spindle, an auxiliary spindle on said support for mounting said film reel, recording and playback means on said support which the film from said film reel traverses during feed to said projector, and cooperating means interconnecting said clamping means and said support for angular adjustment relative to each other whereby the take-off angle of said film from said adapter may be adjusted to come within said limited range.

8. A sound attachment for a motion picture projector of the type including an arm journaling a main spindle mounting a film reel, said main spindle having an abutment establishing a predetermined feed path for the film with respect to said projector, said sound attachment comprising a support including an auxiliary spindle for mounting said reel of film, an attachment collar on said support operatively connectable at said main spindle for mounting said support and reestablishing said predetermined feed path, and a magnetic recording and playback head on said support arranged along said predetermined feed path, said attachment collar including a rearwardly directed countersink having a bottom surface in bearing contact with said abutment, and clamping means adjustably mounted on said attachment collar for detachably securing same on said arm.

9. A universal sound adapter for motion picture projectors of the type including a main spindle journaled on an arm and adapted to mount film reels of varying sizes comprising a support having a mounting section and a reel-supporting extension, means on said mounting section of said support for detachably securing said support to said arm with said reel-supporting extension projecting to a clearance position with respect to said projector, said mounting section being proportioned relative to the film reels of varying size to fall within the outline of the smallest of the film reels when mounted on said main spindle, an auxiliary spindle on said reel-supporting extension at said clearance position for mounting the film reels, and a magnetic recording and playback head on said mounting section over which film passes during feed to said projector.

10. A universal sound adapted according to claim 9, wherein said auxiliary spindle at said clearance position is spaced relative to said main spindle in an amount to accommodate the largest of said film reels when mounted on said auxiliary spindle substantially beyond the outline of said mounting section.

11. A sound attachment for a motion picture projector of the type having a spindle normally mounting a reel of film and establishing a predetermined film feed path with respect to said projector comprising a support including means for mounting said reel of film, an attachment member on said support and operatively connectable at the projector spindle for mounting said support and reestablishing said predetermined film feed path, and transducing means on said support and arranged along said predetermined film feed path.

12. In combination with a motion picture projector including a reel-supporting arm having a bearing, and a feed spindle journaled in said bearing for normally receiving a film reel, said feed spindle having an abutment for establishing a predetermined feed path for the film from said reel with respect to said projector, a sound attachment comprising a support, an auxiliary spindle on said support for said reel, a recording and playback head on said support spaced from said auxiliary spindle, means for guiding the film from said reel over said recording and playback head and establishing a feed path through said sound attachment, and an attachment member on said support operatively connectable at said feed spindle in relation to said abutment for orienting the feed path through said sound attachment in substantial coplanar relation to said predetermined feed path.

13. In combination with a motion picture projector including a reel-supporting arm and a feed spindle, said feed spindle having means for establishing a predetermined edge plane for film from a reel which is to be fed through said projector, a sound attachment comprising a support, an auxiliary spindle on said support for mounting said film reel, a recording and playback head on said support spaced from said auxiliary spindle, means for guiding said film over said recording and playback head and establishing an edge plane for said film through said sound attachment, an attachment member on said support operatively connectable at said feed spindle for orienting the respective edge planes in substantial coplanar relation, said attachment member having a bore substantially accommodating said bearing and a counter bore terminating in a shoulder position in relation to and contacting said abutment for orienting said edge planes.

14. In combination with a motion picture projector including a feed spindle supporting a film reel, and means for establishing a feed path for the film with respect to said projector and said feed spindle, a sound attachment comprising a support having an auxiliary spindle adapted to mount the film reel, a record-playback head on said support over which the film passes from said film reel to said projector, means for guiding film over said recording and playback head and establishing a feed path for the film with respect to said sound attachment, and securing means fixed at said support and operatively connectable at said feed spindle for bringing the respective feed paths into substantial coplanar relation.

15. An attachment for a motion picture projector, said projector having a main spindle for supporting a film reel, said film having a recording track along at least one edge, a projection system, and means for maintaining said film reel on said main spindle in such spatial relation with respect to said projection system, that film may pass unobstructedly and without binding from said reel to said projection system, said attachment comprising a supporting member, an auxiliary spindle for said film reel secured solely to said supporting member, a transducer for said recording track secured solely to said supporting member, said auxiliary spindle and said transducer being aligned in a common plane to enable feed of said film from said auxiliary spindle through said transducer in record-transducing relation, and means secured to said attachment and operatively connected at said main spindle for attaching said supporting member on said main spindle and orienting the attachment in such spatial relation axially of said main spindle that said film feeds in coplanar relation from said transducer to said projection system whereby the film may travel from said attachment to said projector in unobstructed relation without binding.

16. In combination with a motion picture projector including a rotatable feed spindle having an abutment for establishing a predetermined feed path for a film reel with respect to said projector, a sound attachment comprising a support, an auxiliary spindle on said support for mounting a film reel, a record-playback head on said support spaced from said auxiliary spindle, means for guiding the film over said record-playback head and establishing a feed path through said sound attachment, and attachment means on said support operatively connectable at said feed spindle in relation to said abutment for orienting the feed path through said sound attachment in substantial coplanar relation with said predetermined feed path.

17. An attachment for a motion picture projector including a main spindle for supporting a reel of film having a marginal recording track, a film-projection system, and means for maintaining said reel on said main spindle in a required spatial relation to said projection system, said attachment comprising an auxiliary spindle for said reel, a transducer arranged relative to said auxiliary spindle to be in record-transducing relation to said recording track, and means operatively connected at said main spindle for orienting said attachment relative to said projection system to reestablish said required spatial relation when said reel is on said auxiliary spindle.

References Cited in the file of this patent

UNITED STATES PATENTS

| | | |
|---|---|---|
| 1,877,731 | Kuchenmeister | Sept. 13, 1932 |
| 2,064,049 | Wurm | Dec. 15, 1936 |
| 2,273,855 | Foster | Feb. 24, 1942 |
| 2,324,658 | Wandel | July 20, 1943 |
| 2,501,055 | Hume | Mar. 21, 1950 |
| 2,532,761 | Blasio | Dec. 5, 1950 |